United States Patent
McNicol et al.

(10) Patent No.: US 7,522,842 B1
(45) Date of Patent: Apr. 21, 2009

(54) OPTICAL TRANSMISSION SYSTEM USING RAMAN AMPLIFICATION

(75) Inventors: John McNicol, Ottawa (CA); Kuang Tsan Wu, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 414 days.

(21) Appl. No.: 11/239,148

(22) Filed: Sep. 30, 2005

(51) Int. Cl.
 H04B 10/08 (2006.01)
 H04B 10/00 (2006.01)
 H04J 14/02 (2006.01)

(52) U.S. Cl. .......................... 398/157; 398/37; 398/92; 398/33; 398/160

(58) Field of Classification Search ............. 398/30–33, 398/37, 38, 92, 157, 160
See application file for complete search history.

(56) References Cited

U.S. PATENT DOCUMENTS

| | | | |
|---|---|---|---|
| 5,668,658 A * | 9/1997 | Hamada ................. | 359/341.43 |
| 5,883,735 A * | 3/1999 | Sugiyama et al. ...... | 359/341.42 |
| 6,038,062 A * | 3/2000 | Kosaka ........................ | 359/337 |
| 6,771,853 B2 * | 8/2004 | Watanabe ..................... | 385/24 |
| 7,274,871 B2 * | 9/2007 | Avallone et al. .............. | 398/30 |
| 2002/0191906 A1 * | 12/2002 | Price et al. .................... | 385/24 |
| 2004/0197103 A1 * | 10/2004 | Roberts et al. ............... | 398/159 |

OTHER PUBLICATIONS

Emori et al., "Broadband lossless DCF using Raman amplification pumped by multichannel WDM laser diodes", *Electronics Letters*, Oct. 29, 1998, vol. 34, No. 22, pp. 2145-2146.

Emori et al., "100nm bandwidth flat-gain Raman amplifiers pumped and gain-equalised by 12-wavelength-channel WDM laser diode unit", *Electronics Letters*, Aug. 5, 1999, vol. 35, No. 16, pp. 1355-1356.

Haxell et al., "2410km All-Optical Network Field Trial with 10GB/s DWDM Transmission", *Qtera Corporation and Qwest Communications*, pp. 290-292.

Nielsen et al., "3.28-Tb/s Transmission Over 3×100 km of Nonzero-Dispersion Fiber Using Dual C- and L-Band Distributed Raman Amplification", *IEEE Photonics Technology Letters*, vol. 12, No. 8, Aug. 2000, pp. 1079-1081.

* cited by examiner

*Primary Examiner*—Dalzid Singh
(74) *Attorney, Agent, or Firm*—Jeffrey M. Measures; Borden Ladner Gervais LLP

(57) ABSTRACT

A commercially viable All-Raman system, is implemented by removing the dispersion compensating Fiber (DCF) and two stage amplifier at each span, and including a transmission path dispersion compensator which performs dispersion compensation on a transmission path basis. For example, by pre-compensating for the accumulated dispersion in the electrical domain at the transmitter, the gain of the Raman pumps at each span amplifier need only compensate for the loss within the span, without needing to compensate for the loss of a DCF. In addition there is provided a low-cost method for implementing a bidirectional Service Channel by modulating/demodulating low-rate data on the Raman pump. For example, a Raman amplifier can include an information source for producing a service channel signal which includes information to be communicated; and a modulator for modulating the Raman pump signal with the service channel signal.

25 Claims, 7 Drawing Sheets

Figure 1 Transmitter Pre-compensation
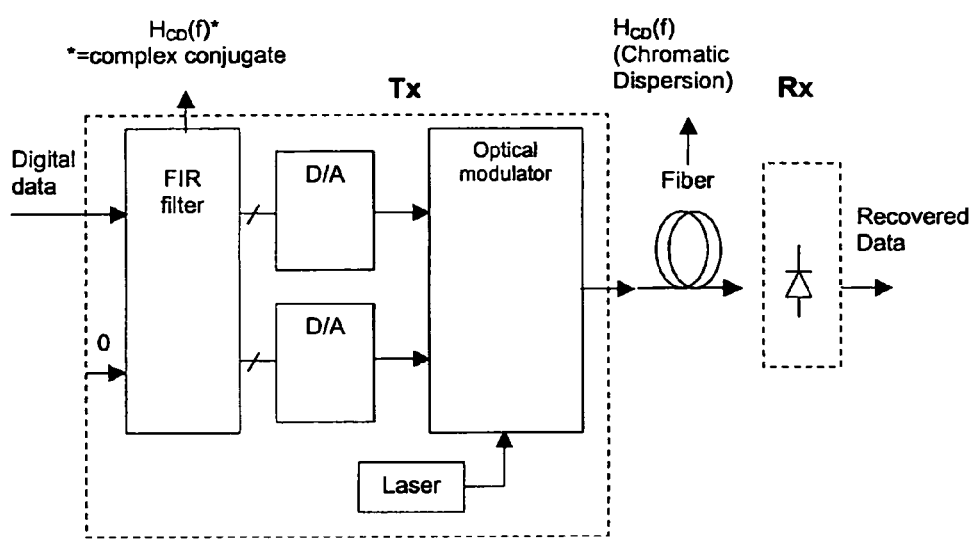

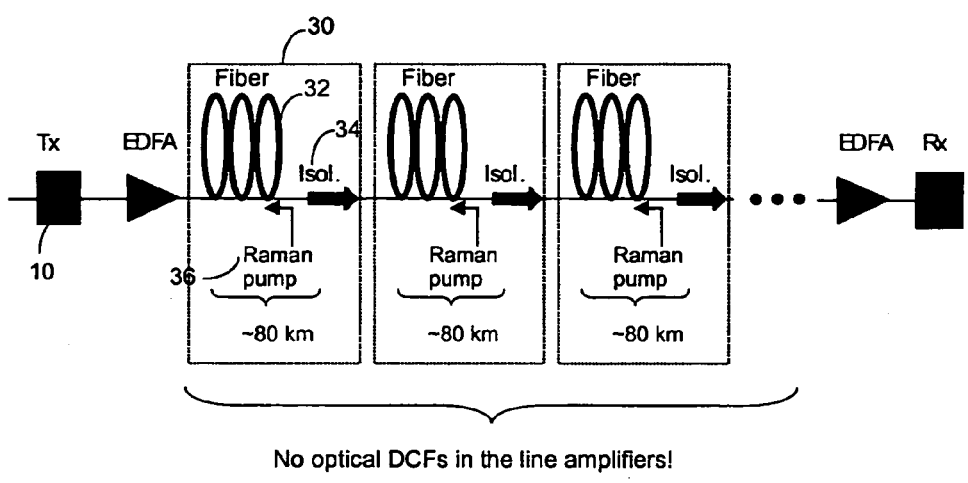
Figure 2 An ULR (Ultra Long Reach) line system with 'All-Raman' line amplifiers and without optical DCFs

Figure 3 A coherent receiver with electronic dispersion compensation & signal processing
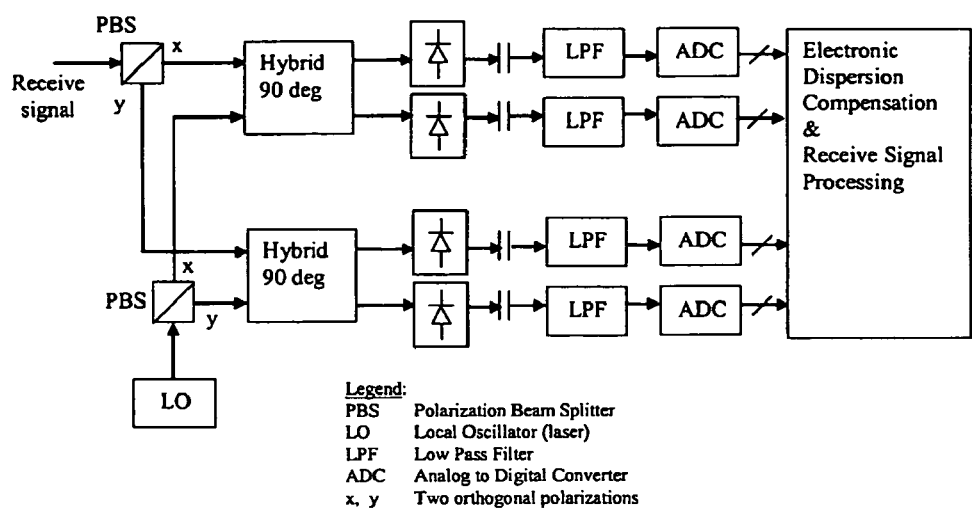

Figure 4 Illustrative Raman gain equalization with N-1 simple Raman amplifiers plus one complex Raman amplifier designed to equalize the gain ripple from the N-1 Raman amplifiers
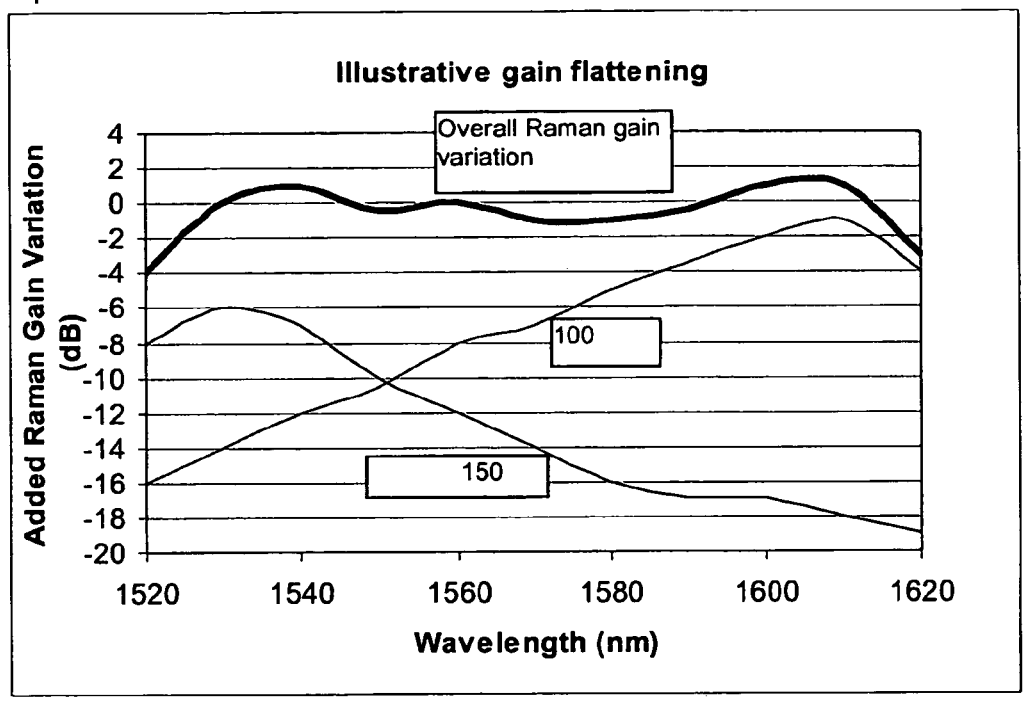
Note: The gain variation is the actual gain minus the desired flat gain in dB.

Figure 5 A more complex Raman amplifier using multiple Raman pumps
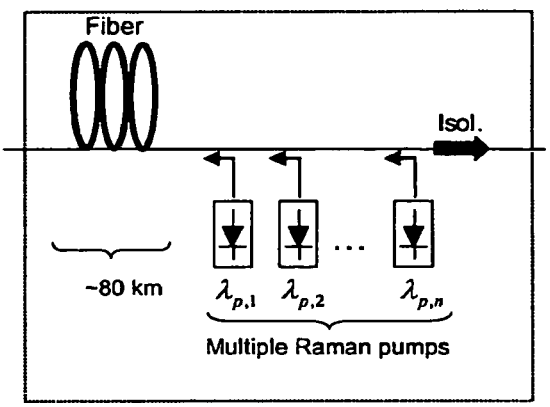

Figure 6 Bidirectional integral service channel for low-cost repeater sites using modulated Raman pump
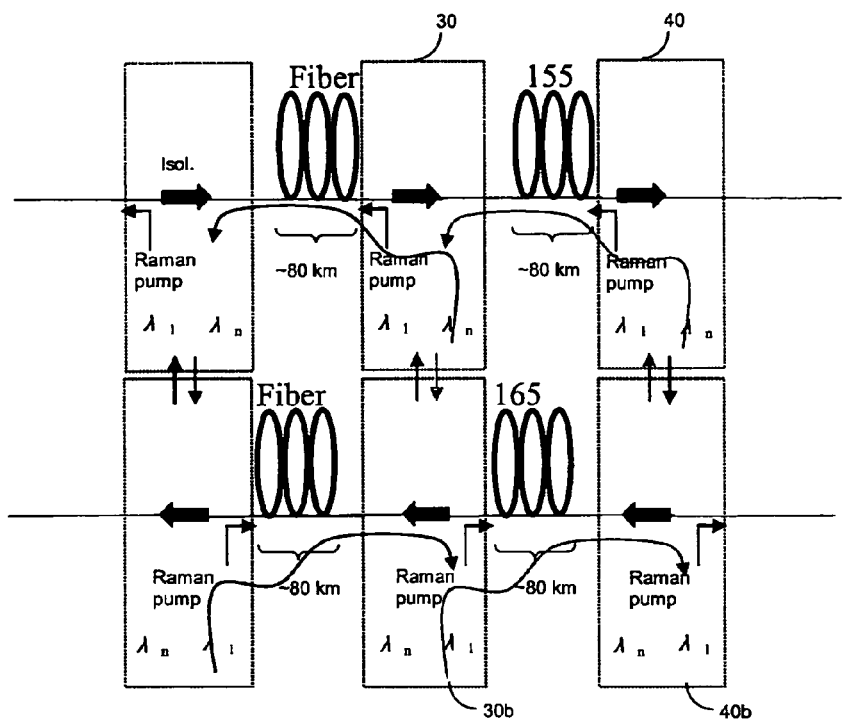

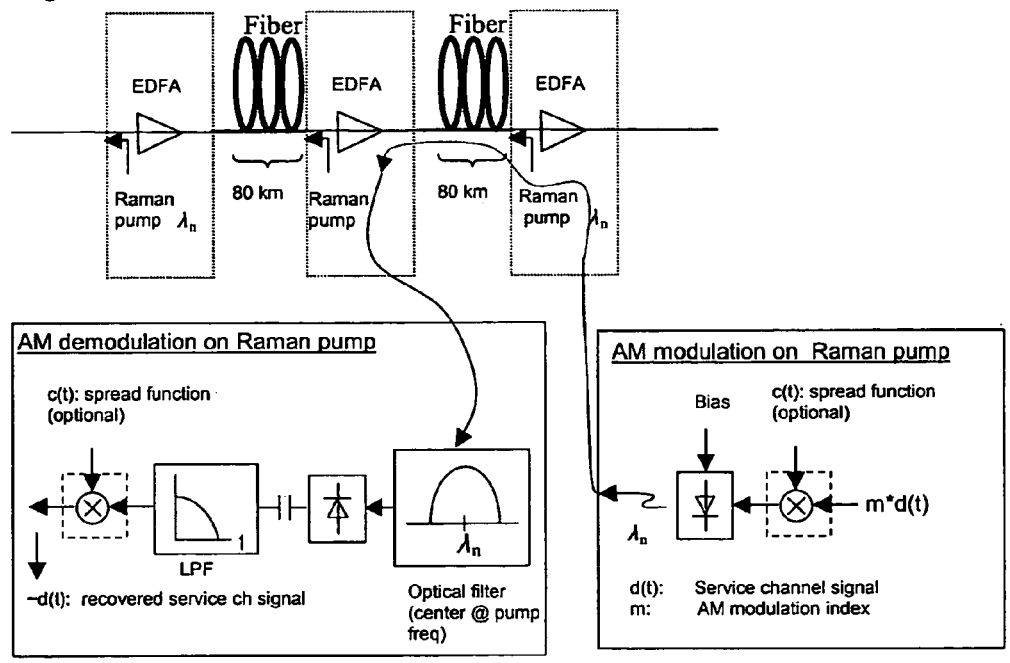
Figure 7 Functional block diagrams of AM modulation/demodulation on pump laser for integral service channel

OPTICAL TRANSMISSION SYSTEM USING RAMAN AMPLIFICATION

CROSS REFERENCE TO RELATED APPLICATIONS

This application claims the benefit of U.S. application Ser. No. 10/262,944 filed Oct. 3, 2002, and assigned to the assignee of the present application, which is incorporated herein by reference.

FIELD OF THE INVENTION

The present invention relates generally to optical transmission networks. More particularly, the present invention relates to optical transmission networks which require amplification and dispersion compensation. An aspect of the invention relates to transmitting information between nodes.

BACKGROUND OF THE INVENTION

A known problem with conventional optical transmission systems is the loss of power as an optical signal propagates through the transmission path between optical nodes. A well known solution to this problem involves dividing the transmission path into spans. Each span ends with an optical amplifier site (hereafter "amplifier"), which amplifies the signal in the optical domain, to compensate for the loss that occurred within the span. The amplifier also serves to couple adjacent spans, allowing the amplified signal to propagate through the next span.

Another problem is optical dispersion as the signal propagates through the optical fiber. Prior Art solutions compensate for the optical dispersion on a per span basis, by including an optical dispersion compensator as part of every span. The optical dispersion compensator typically forms part of the amplifier site, and typically comprises a segment of Dispersion Compensation Fiber (DCF). The length and characteristics of the segment of DCF are selected to have negative dispersion characteristics to those of the transmission span fiber, in order to offset the total dispersion along the span.

However, such an optical dispersion compensator introduces its own signal loss. Thus prior art dispersion compensation systems which compensate for dispersion on a per span basis, increase the total loss of each span, as loss of power occurs in both the transmission portion of the span, and in the DCF portion of the span. The loss of the DCF is not insignificant, being in the order of 8 dB of loss, whereas the loss for an 80 km transmission span having 0.25 dB/km loss is 20 dB. Thus the total loss is 28 dB.

A known solution is to include an Erbium Doped Fiber Amplifier (EDFA) or SOA (semiconductor optical amplifier) to amplify the signal to compensate for the loss. Typically a Two-staged EDFA is used, with the DCF segment between the two stages of the EDFA. The $1^{st}$ stage is designed to have high gain in order to minimize the overall noise figure and the overall gain of the two stages is to compensate for total loss of the fiber span, including the DCF.

However, the EDFAs are expensive, and although an amplifier is needed for span loss, the inclusion of the DCF adds the additional cost of the Two-stage EDFA.

In order to avoid the cost of EDFAs, a known solution includes the use of Raman pump amplifiers. A Raman "pump" amplifies the signal by using a laser to inject another wavelength into the fiber, which acts to distributively amplify the signal. Typically, Raman pump amplifiers are at the junction between spans. There are two types of Raman pump. A "co-pump" is sent in the direction of transmission from the transmitter location. A counter pump is injected from a location in the opposite direction to that of transmission and has the effect of amplifying the signal which is received at that location.

As a signal often traverses multiple spans, it is important to compensate as much as possible for the total loss across each span, which includes the DCF loss. Thus the Raman Pump/amplifier should have sufficient power or gain to compensate for the total span loss. The additional loss introduced by the DCF has in the past sufficiently increased the cost and complexity of Raman pump amplifiers to the point where they are no longer cheaper than the Two-stage EDFAs. Thus, while showing great theoretical promise, an "All-Raman" system has proven to be very difficult to implement in a commercially viable manner.

Some systems use both an EDFA and a Raman pump (known as hybrid EDFA/Raman) to compensate for the total loss from the fiber and the DCF. However, although one EDFA is eliminated, a hybrid EDFA/Raman is not necessarily cheaper than a Two-stage EDFA.

It is, therefore, desirable to provide a Dispersion compensation method which does not add significant additional loss to the signal. By using such a technique, the Two-stage amplifier can be eliminated.

SUMMARY OF THE INVENTION

We have realized that including optical dispersion compensators on a per span basis (i.e., in the amplifier sites) is a significant contributor to the difficulty of implementing a commercially viable All-Raman system. This realization facilitates the implementation of "All Raman" systems which do not include optical dispersion compensators as part of each span, but rather implement dispersion compensation on a transmission path basis. This means the total dispersion accumulated across the transmission path is compensated.

In this specification, a transmission path includes an optical transmitter node, an optical receiver node, and a plurality of spans of optical fiber, coupled together by optical amplifiers (amplifier sites), which can carry a signal from the optical transmit node to the optical receiver node.

In a first aspect, the present invention provides an optical communication system comprising: an optical transmitter node for transmitting an optical signal; an optical receiver node, which when coupled to said optical transmitter by a transmission path receives said optical signal, said transmission path comprising a plurality of spans of optical fiber; a transmission path dispersion compensator which performs dispersion compensation on a transmission path basis; and an amplifier site, for each of said plurality of spans, for compensating for signal loss as said optical signal propagates through each span and optically coupling adjacent spans, each amplifier site comprising a single optical amplifier, said single amplifier comprising a Raman Pump/amplifier.

In such a system, the transmission path dispersion compensator compensates for the total dispersion which accumulates along the transmission path, thus eliminating the need for a dispersion compensator at each span junction. As there is no need for a dispersion compensator at each span junction, there is no longer a need to compensate for the signal loss of the dispersion compensator at each span. Thus, the total gain of an amplifier at each amplifier site only needs to compensate for the transmission loss across the span. This reduces the gain requirements for each span amplifier.

Thus, each amplifier site only requires a single Raman Pump/amplifier, and does not need an expensive Two-stage amplifier, as was required by prior art systems which required a dispersion compensator at each amplifier site.

According to one embodiment, transmission path dispersion compensator is located at one of said optical nodes, and compensates for all of the dispersion across the transmission path in the electrical domain. For example, the transmission path dispersion compensator can be located at said optical transmitter node, and compensates for said dispersion by pre-distorting an electrical signal to be transmitted with a dispersion compensation function prior to optical modulation and transmission, said dispersion compensation function determined to mitigate the chromatic dispersion of the optical communication system. The transmission path dispersion compensator is preferably located in the transmitter for IMDD (intensity modulation & direct detection) systems or in the transmitter or receiver or a combination of both for coherent systems.

According to an embodiment of the invention, the transmission path dispersion compensator is located at the optical transmitter node and comprises: a processor adapted to determine a compensation function that substantially mitigates the chromatic dispersion imparted to the communications signal by the optical communications system; a digital filter for filtering an electrical input signal using the compensation function to generate a predistorted electrical signal; and an optical modulator for modulating an optical source using the predistorted electrical signal to generate a corresponding pre-distorted optical signal for transmission through the optical communications system.

In a further aspect, the present invention provides a low-cost method for implementing a bidirectional Service Channel by modulating/demodulating low-rate data on the Raman pump. For example, according to an aspect of the invention there is provided a Raman amplifier comprising: a Raman Pump laser for injecting a Raman pump signal into a span of optical fiber; an information source for producing a service channel signal which includes information to be communicated; and a modulator for modulating said Raman pump signal with said service channel signal.

Preferably the amplifier further comprises a receiver for receiving a Raman Laser signal injected into an adjacent span by an adjacent amplifier, said receiver including a demodulator for demodulating said information signal.

In a preferred embodiment such an amplifier further comprises a spread function signal generator for generating a spread spectrum function signal; and a mixer, for mixing said spread function signal with said service channel signal prior to modulation. Correspondingly, for cases where such spreading is used, the amplifier receiver should be capable of generating a de-spread spectrum function signal dependent on said spread spectrum function signal; and mixing said de-spread function signal with said received signal to regenerate the original service channel data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 is a functional block diagram of a transmitter with electronic dispersion compensation done in the FIR filter, according to an embodiment of the invention.

FIG. 2 shows an ULR (Ultra Long Reach) line amplifier system with 'All-Raman' line amplifiers and without optical DCFs according to an embodiment of the invention.

FIG. 3 is a block diagram illustrating a coherent receiver with electronic-dispersion compensation & signal processing, according to an embodiment of the invention.

FIG. 4 is a graph Illustrating Raman gain equalization with N−1 simple Raman amplifiers plus one complex Raman amplifier designed to equalize the gain ripple from the N−1 Raman amplifiers, according to am embodiment of the invention.

FIG. 5 is a block diagram of a more complex amplifier with multiple Raman pumps to equalize the gain ripple accumulated over the N−1 simple Raman amplifiers, according to am embodiment of the invention.

FIG. 6 illustrates a bidirectional integral service channel for low-cost amplifier sites using an modulated Raman pump, according to an embodiment of the invention.

FIG. 7 shows functional block diagrams of AM modulation/demodulation on pump laser for an integral service channel, according to an embodiment of the invention.

DETAILED DESCRIPTION

Generally, an aspect of the present invention provides a method and system for implementing a commercially viable All-Raman system, by including a transmission path dispersion compensator which performs dispersion compensation on a transmission path basis.

Nortel Networks Next Generation Modulator (NGM) provides an example of such a system. It compensates for the dispersion on a transmission path basis, by using pre-compensation (in the electrical domain) to add negative compensation at the transmit side. Advantageously, this eliminates the need for a dispersion compensator at each span, and does so without adding additional loss.

By eliminating the need for DCF, the NGM reduces the gain required by each Raman Pump. This finally enables a commercially viable All-Raman system.

FIG. 1 shows the functional block diagram of a transmitter which includes a transmission path dispersion compensator, according to an embodiment of the invention. In this example, the transmission path dispersion compensator comprises an FIR filter. The FIR filter pre-compensates the data signal to be transmitted with a compensation function in the electrical domain. The fiber dispersion can be represented as a linear transfer function $H_{CD}(f)$. The FIR filter compensation function is chosen to be $H_{CD}(f)^*$ (i.e., the complex conjugate of $H_{CD}(f)$). Accordingly once the signal is output in the optical domain (via the D/A converters, Optical modulator and laser), the output signal would appear as noise, due to the pre-compensation. However, once the signal propagates through the fiber, the accumulated fiber dispersion and the pre-compensation effectively cancel, allowing the receiver to recover the data signal.

An All-Raman system (e.g., An Ultra Long Haul (URL) Line System), according to an embodiment of the invention is shown in FIG. 2. Such a system includes a Transmitter 10 and an initial EDFA to provide sufficient launch power for transmitting a signal. Preferably, the transmitter is the transmitter of FIG. 1.

The All-Raman system of FIG. 2 is divided into a series of N segments called spans (S1, S2, S3, . . . , SN) linking the transmitter Tx to a receiver R, preferably via a final EDFA. As each span will introduce span loss to the signal, adjacent spans are connected by an amplifier site. As the transmitter of FIG. 1 eliminates the need for DCF, there is no additional loss caused by the DCF. Thus, each span will only require a single Raman Pump with a gain equal to the Span loss. For example Segment 30 is shown to include a length of Fiber 32, an Isolator 34 and a Raman Pump 36. The length of each span is often in the order 80 km. However, the length of fiber will likely vary, in order to accommodate suitable locations for the amplifier sites. The isolator 34 is used to reduce Multi Path Interference (MPI) caused by double Rayleigh backscattering. Typically the Amplifier site will include the Isolator 34 and the Raman Pump 36. Note that this figure illustrates only one direction, of what is typically a bidirectional system. Typically each span includes one or more pairs of fibers to allow forward and reverse path transmission. Typically the amplifier site will include a Raman pump and isolator for each fiber.

Each span will have a fiber induced dispersion (D1, D2 ... DN). As Dispersion is a linear effect, it is additive; thus total dispersion along the transmission path is $D=D1+D2+D3+\ldots+DN$.

FIG. 3 shows the block diagram of a coherent receiver which performs electronic dispersion compensation, according to an embodiment of the invention. The receive signal is split into two orthogonal polarization signals by a polarization beam splitter (PBS), which are combined with a local oscillator (laser) via two 90-degree hybrids and detected by four PINs. This is known as coherent detection. After AC-coupling and lowpass filtering, the four baseband signals are digitized by four multi-bit ADCs and sent to the signal processor, which performs electronic dispersion compensation and other functions such as polarization recovery, carrier recovery and intersymbol interference (ISI) equalization. The dispersion compensation can be implemented in the time domain or in the frequency domain. For large dispersion compensation, it is more efficient to implement in the frequency domain. The amount of dispersion compensation depends on if transmitter pre-compensation is used. For example, one can use 50% of the dispersion compensation in the transmitter and 50% in the receiver, or 100% in the receiver if transmitter dispersion pre-compensation is not used.

Thus transmission path dispersion compensator can be located in the transmitter 10 of FIG. 1, the Receiver of FIG. 3, or both. In any event, the transmission path dispersion compensator can perform dispersion compensation on a transmission path basis by compensating for D.

As mentioned above, additional aspects of a transmission path dispersion compensator, are described in U.S. patent Ser. No. 10/262,944 filed Oct. 3, 2002, and assigned to the assignee of the present application, the specification of which is hereby incorporated by reference in its entirety. This patent describes various methods and compensation modulators for forming a transmission path dispersion compensator.

Advantageously, by eliminating the DCF and EDFAs, the non-linear effects caused by these components are also eliminated.

Note most typical transmission systems carry many wavelengths per fiber (e.g., DWDM systems). Due to the multiple wavelengths, each Raman pump in each amplifier site adds some ripple to the gain versus wavelength. Accordingly, it is contemplated that for N amplifier sites, N−1 are simple Raman sites, as described in reference to FIG. 2. Preferably one of the sites is a more complex site which is designed to compensate for the accumulated ripple by a process of re-equalization of gain spectrum. The idea is illustrated in FIG. 4, according to an embodiment of the invention. The N−1 simple Raman amplifier sites use a single Raman pump and generate a simple Raman gain spectrum. Accumulation of the N−1 Raman gain spectra would show gain variation versus wavelength. Thus, it is desirable to add a more complex Raman amplifier site to equalize the gain versus wavelength. This can be done by careful design using multiple Raman Pumps at different wavelengths to achieve the desired gain spectrum. In FIG. 4, curve 100 represents the accumulated Raman gain variation from the N−1 Raman amplifiers. Curve 150 is the Raman gain variation spectrum from a more complex Raman amplifier designed such that the overall gain spectrum of the N Raman amplifiers is preferably more or less flat to within 1 to 2 dB in the desired wavelength range of operation. A block diagram of such a complex amplifier site according to an embodiment of the invention is illustrated in FIG. 5. FIG. 5 shows a more complex Raman amplifier site using multiple Raman pumps, wherein the wavelengths and the power levels of the multiple Raman pumps are chosen to equalize the gain ripple accumulated from the N−1 simple Raman amplifier sites.

We have recognized an additional advantage of using Raman amplification. The Raman pump can provide a medium for transmitting information, thus enabling service channel, communication between amplifier sites. As an example, a Bidirectional integral service channel for low-cost repeater sites using modulated Raman pumps, according to an embodiment of the invention, is illustrated in FIG. 6. In this example, a transmission signal is transmitted in the west to east direction between sites 40 and 30 via fiber 155. Amplifier 40 includes a Raman pump, which injects $\lambda_n$ into fiber 155 in order to amplify the transmission signal from 30 to 40. Similarly, a data signal is transmitted in the east to west transmission direction, from site 40b to 30b via fiber 165, and Amplifier 30b includes a Raman pump, which injects $\lambda_1$ into fiber 165 in order to amplify the transmission signal from 40b to 30b.

In this example Service Channel information can be passed in the direction from site 40 to site 30 by "piggybacking" on the pump signal ($\lambda_n$) (e.g, by modulating the pump signal with service channel bits). Similarly, the Service Channel information can be passed from site 30b to 40b by piggybacking on the pump signal ($\lambda_1$). Where multiple pumps are used, preferably the largest pump wavelength is used for the service channel, as this provides for the lowest attenuation.

Accordingly, as well as adding gain to the signal, the Raman Pump can be modulated to carry information in the reverse direction. Preferably this is a low rate service channel which can be accomplished by AM modulation of the Raman pump. Thus, the service channel is created by modulating a digital bit stream m(t), which includes the service channel information with the Raman Pump laser signal.

Note that the AM modulation rate of the service channel signal m(t), is preferably chosen in order to limit the amount of AM transfer onto the forward optical path. This is because a modulating signal on the pump can have the unwanted effect of modulating the forward signal path (i.e., the data signal being amplified). This depends on the length over which the counter propagating Raman pump and the forward signal overlap. Fortunately, only the low frequency content couples strongly for typical span lengths. The high frequency content on the pump will be averaged out over the length of Raman gain interaction, whereas the low frequency noise does not have enough length to average out the Raman gain fluctuation. For example, for a 10 Gbit/sec signal in the forward path, the Raman pump should be modulated at a rate exceeding ~100 kb/s in order to limit AM transfer onto the 10 Gb/s signal.

Advantageously this does not add much cost to the amplifier site, as relatively inexpensive components (e.g., a photodetector, lowpass filter and simple decision device) can be used to receive and decode such a service channel signal.

Note that we show a counter-Pump, rather than a co-pump, as this allows for less AM transfer to the forward path, as well as having a lower noise figure and introduces less nonlinear effects. However, if designed correctly, a co-pump can be used.

Note that the integral bidirectional service channel discussed herein for the All-Raman system is also useful in conventional hybrid Raman/EDFA amplifier sites. A block diagram of an AM modulator and demodulator are shown in FIG. 7 for such a system, according to an embodiment of the invention. Of course if transmission path dispersion compensation is used, than the EDFAs shown in FIG. 7 will typically not be needed.

Referring to the AM modulation block of FIG. 7, in a repeater/amplifier site, start with m*d(t), wherein d(t) is the Service channel signal and m is the AM modulation index. This is optionally mixed with c(t): a spread function signal to provide a suitable processing gain to the signal. This is useful if the actual Service channel information rate is too low. For example if the service channel signal is only 10 kb/s it is converted to a higher rate signal (100 kb/s) by multiplying it with a maximum-length sequence c(t). As pointed out earlier, this increased higher-rate modulating signal serves to minimize the AM transfer to the forward path. The mixed signal is then used to modulate the pump laser, which is subject to a DC Bias (to provide a constant light intensity), resulting in an AM-modulated Raman Pump signal at a predetermined wavelength $\lambda n$.

The adjacent Amplifier site includes an AM demodulator in order to receive the modulated service channel information. Such a receiver includes an optical filter (centered at the $\lambda n$ pump frequency) to filter out unwanted noise. The filtered signal is passed through a photodectector and AC-coupled to convert the optical signal into an electrical signal. This is then passed through a Low Pass Filter (LPF) and then mixed with the optional c(t): de-spread function signal in order to recover the d(t): Service channel signal. The optional despread signal is the same as the spread signal. Detailed recovery of the de-spread signal can use well-known techniques in the spread spectrum communication field and is omitted here.

Note that although the receiver and modulator are shown in separate amplifier sites, each amplifier site will typically include both for a bidirectional service channel. For example, the combined amplifier site 40/40b in FIG. 6, would need a modulator block for $\lambda_n$ and a demodulator block for $\lambda_1$.

Note that other components, including supporting electronics for bias (current control), cooling and wavelength control, a controller, memory, and appropriate software for controlling the amplifier site, and interpreting or constructing the service channel signal, are not shown as they are standard practice and application specific.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An Optical communication system comprising:
    an optical transmitter node for transmitting an optical signal;
    an optical receiver node, coupled to said optical transmitter by a transmission path for receiving said optical signal, said transmission path comprising a plurality of spans of optical fiber;
    a transmission path dispersion compensator which performs dispersion compensation on a transmission path basis;
    an amplifier site, for each of said plurality of spans, for compensating for signal loss as said optical signal propagates through each span and optically coupling adjacent spans, each amplifier site comprising a single optical amplifier, said single amplifier comprising a Raman Pump/amplifier;
    wherein said transmission path dispersion compensator is located at said optical transmitter node, and compensates for all of the dispersion across the transmission path in the electrical domain; and
    wherein said transmission path dispersion compensator comprises:
        a processor adapted to determine a compensation function that substantially mitigates the chromatic dispersion imparted to the communications signal by the optical communications system;
        a digital filter for filtering an electrical input signal using the compensation function to generate a predistorted electrical signal; and
        an optical modulator for modulating an optical source using the predistorted electrical signal to generate a corresponding predistorted optical signal for transmission through the optical communications system.

2. An optical communication system as claimed in claim 1, wherein said a Raman pump is configured to have a gain which only compensates for the signal loss of the preceding span.

3. An optical communication system as claimed in claim 1, wherein said transmission path dispersion compensator is located at said optical transmitter node, and compensates for said dispersion by pre-distorting an electrical signal to be transmitted with a dispersion compensation function prior to optical modulation and transmission, said dispersion compensation function determined to mitigate the chromatic dispersion of the optical communication system.

4. An optical communication system as claimed in claim 1 wherein said optical receiver comprises a coherent receiver; and wherein said transmission path dispersion compensators are located at both said optical transmitter node and optical receiver node, and compensates for said chromatic dispersion of the optical communication system by a form of transmitter pre-compensation and receiver time-domain equalization.

5. An optical communication system as claimed in claim 1, wherein said plurality of spans comprises N spans, with N amplifiers, wherein 1 of said N amplifiers additionally comprise a ripple compensator for compensating for accumulated gain ripple.

6. An optical communication system as claimed in claim 1, wherein said plurality of spans comprises N spans, with N amplifiers, wherein 1 of said N amplifiers comprises multiple Raman pumps with different wavelengths for re-equalization of Raman gain versus wavelength.

7. An Optical communication system comprising:
    an optical transmitter node for transmitting an optical signal;
    an optical receiver node, coupled to said optical transmitter by a transmission path for receiving said optical signal said transmission path comprising a plurality of spans of optical fiber;
    a transmission path dispersion compensator which performs dispersion compensation on a transmission path basis;
    an amplifier site, for each of said plurality of spans, for compensating for signal loss as said optical signal propagates through each span and optically coupling adjacent spans, each amplifier site comprising a single optical amplifier, said single amplifier comprising a Raman Pump/amplifier;

wherein said transmission path dispersion compensator is located at one of said optical nodes, and compensates for all of the dispersion across the transmission path in the electrical domain; and wherein said optical receiver comprises a coherent receiver, and wherein said transmission path dispersion compensator is located at said optical receiver node and comprises a signal processor, which performs electronic dispersion compensation.

8. An optical communication system as claimed in claim 7 wherein said signal processor compensates for said chromatic dispersion of the optical communication system in the time domain.

9. An optical communication system as claimed in claim 7 wherein said signal processor compensates for said chromatic dispersion of the optical communication system in the frequency domain.

10. An Optical communication system comprising:

an optical transmitter node for transmitting an optical signal;

an optical receiver node, which when coupled to said optical transmitter by a transmission path receives said optical signal, said transmission path comprising a plurality of spans of optical fiber;

a transmission path dispersion compensator which performs dispersion compensation on a transmission path basis;

an amplifier site, for each of said plurality of spans, for compensating for signal loss as said optical signal propagates through each span and optically coupling adjacent spans, each amplifier site comprising a single optical amplifier, said single amplifier comprising a Raman Pump/amplifier;

wherein said transmission path dispersion compensator is located at one of said optical nodes, and compensates for all of the dispersion across the transmission path in the electrical domain;

wherein said Raman Pump includes a laser, coupled to said optical fiber, for injecting a laser signal into the span and wherein said amplifier further comprises:

an information source for producing a service channel signal which includes information to be communicated;

a modulator for modulating said laser signal with said service channel signal; and wherein said modulator comprises an AM Modulator and further comprising:

a spread function signal generator for generating a spread spectrum function signal; and a mixer, for mixing said spread function signal with said service channel signal prior to modulation.

11. An optical communication system as claimed in claim 10 wherein said amplifier further comprises a receiver for receiving a Raman Laser signal injected into an adjacent span by an adjacent amplifier, said receiver including a demodulator for demodulating said information signal.

12. An optical communication system as claimed in claim 10 further comprising:

an optical filter centered at the desired Raman pump wavelength;

a PIN receiver for receiving a Raman Laser signal injected into its span by an adjacent amplifier, and detecting the AM-modulated signal;

a lowpass filter to further limit the noise;

a de-spread function signal generator for generating a de-spread spectrum function signal dependent on said spread spectrum function signal; and a mixer, for mixing said de-spread function signal with said received and filtered signal to regenerate the original service channel data.

13. An Optical communication system comprising:

an optical transmitter node for transmitting an optical signal;

an optical receiver node, which when coupled to said optical transmitter by a transmission path receives said optical signal, said transmission path comprising a plurality of spans of optical fiber; and an amplifier site, for each of said plurality of spans, for compensating for signal loss as said optical signal propagates through each span and optically coupling adjacent spans, each amplifier site comprising:

a Raman Pump laser, coupled to said optical fiber, for injecting a laser signal into the span for amplifying said optical signal;

an information source for producing a service channel signal which includes information to be communicated;

a modulator for modulating said laser signal with said service channel signal;

wherein said modulator comprises an AM Modulator and further comprising:

a spread function signal generator for generating a spread spectrum function signal; and a mixer, for mixing said spread function signal with said service channel signal prior to modulation.

14. An optical communication system as claimed in claim 13 wherein said amplifier further comprises a receiver for receiving a Raman Laser signal injected into an adjacent span by an adjacent amplifier, said receiver including a demodulator for demodulating said information signal.

15. An optical communication system as claimed in claim 13 further comprising:

an optical filter centered at the desired Raman pump wavelength;

a PIN receiver for receiving a Raman Laser signal injected into its span by an adjacent amplifier, and detecting the AM-modulated signal;

a lowpass filter to further limit the noise;

a de-spread function signal generator for generating a de-spread spectrum function signal dependent on said spread spectrum function signal; and a mixer, for mixing said de-spread function signal with said demodulated AM signal to regenerate the original service channel data.

16. A method of transmitting an optical transmission signal across a transmission path which comprises two optical nodes and a plurality of spans coupled together to optically connect said two nodes, wherein each span comprises a length of transmission fiber for providing a transmission medium for the optical signal within said span, and wherein said two optical nodes comprise an optical transmitter at one end of the transmission path and an optical receiver at the far end of said transmission path; said method comprising:

injecting a Raman pump signal into each span in order to amplify the signal within the injected span;

performing dispersion compensation across the entire transmission path at one or both of said optical nodes;

wherein the performing step compensates for all of the dispersion across the transmission path in the electrical domain;

wherein said injecting step additionally comprises:
  producing a service channel signal which includes information to be communicated;
  modulating said Raman Pump signal with said service channel signal;
wherein said modulating step comprises AM modulation and further comprising:
  generating a spread spectrum function signal; and
  mixing said spread function signal with said service channel signal prior to said AM modulation.

17. The method as claimed in claim 16 wherein the performing step is performed at the transmitter node for IMDD systems.

18. The method as claimed in claim 16 wherein the performing step is performed at the transmitter, the receiver node or at both for coherent systems.

19. The method as claimed in claim 16 wherein the gain provided by each Raman Pump is set to compensate for the power loss only within the length of transmission fiber.

20. The method as claimed in claim 16 wherein the performing step compensates for said dispersion by pre-distorting an electrical signal to be transmitted with a dispersion compensation function prior to optical modulation and transmission, said dispersion compensation function determined to mitigate the chromatic dispersion of the optical communication system.

21. The method as claimed in claim 16 further comprising receiving a Raman Pump signal injected into an adjacent span by an adjacent amplifier, said receiving step including demodulating said information signal.

22. The method as claimed in claim 21 wherein said demodulation step comprises:
  generating a de-spread spectrum function signal dependent on said spread spectrum function signal; and
  mixing said de-spread function signal with said received signal to regenerate the original service channel data.

23. A Raman amplifier comprising:
  a Raman Pump laser for injecting a Raman pump signal into a span of optical fiber;
  an information source for producing a service channel signal which includes information to be communicated;
  a modulator for modulating said Raman pump signal with said service channel signal, wherein said modulator comprises an AM Modulator;
  a spread function signal generator for generating a spread spectrum function signal; and
  a mixer, for mixing said spread function signal with said service channel signal prior to modulation.

24. A Raman amplifier as claimed in claim 23 wherein said amplifier further comprises a receiver for receiving a Raman pump signal injected into an adjacent span by an adjacent amplifier, said receiver including a demodulator for demodulating said information signal.

25. A Raman amplifier as claimed in claim 24 further comprising:
  an optical filter centered at the desired Raman pump wavelength;
  a PIN receiver for receiving a Raman Laser signal injected into its span by an adjacent amplifier, and detecting the AM-modulated signal;
  a lowpass filter to further limit the noise;
  a de-spread function signal generator for generating a de-spread spectrum function signal dependent on said spread spectrum function signal; and
  a mixer, for mixing said de-spread function signal with said demodulated AM signal to regenerate the original service channel data.

* * * * *